US012609872B2

(12) United States Patent
Urata et al.

(10) Patent No.: US 12,609,872 B2
(45) Date of Patent: Apr. 21, 2026

(54) CONTROL APPARATUS, CONTROL METHOD AND PROGRAM

(71) Applicant: NTT, Inc., Tokyo (JP)

(72) Inventors: Kengo Urata, Tokyo (JP); Ryota Nakamura, Tokyo (JP); Shigeaki Harada, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/832,264

(22) PCT Filed: Feb. 17, 2022

(86) PCT No.: PCT/JP2022/006484
§ 371 (c)(1),
(2) Date: Jul. 23, 2024

(87) PCT Pub. No.: WO2023/157197
PCT Pub. Date: Aug. 24, 2023

(65) Prior Publication Data
US 2025/0106121 A1      Mar. 27, 2025

(51) Int. Cl.
*G06F 15/177*        (2006.01)
*H04L 41/147*        (2022.01)
*H04L 41/40*         (2022.01)

(52) U.S. Cl.
CPC ............ *H04L 41/40* (2022.05); *H04L 41/147* (2013.01)

(58) Field of Classification Search
CPC .............................. H04L 41/40; H04L 41/147
See application file for complete search history.

(56) References Cited

U.S. PATENT DOCUMENTS

2024/0314046 A1*    9/2024  Urata ..................... H04L 41/40

OTHER PUBLICATIONS

Kengo Urata, Ryota Nakamura, Shigeaki Harada, "Robust VNF Allocation in Virtual Networks under Uncertainty of Traffic Demands and Renewable Energy Resources", NTT Network Technology Laboratories, IEICE Technical. Report, vol. 120, No. 414, IN2020-57, pp. 19-24, Mar. 2021.
Pham Minh et al: "Congestion-Aware and Energy-Aware Virtual Network Embedding", IEEE /ACM Transactions on Networking, IEEE/ACM, New York, NY, US, vol. 28, No. 1, Dec. 30, 2019 (Dec. 30, 2019), pp. 210-223, XP011773538, ISSN: 1063-6692, DOI: 10.1109/TNET.2019.2958367 [retrieved on Feb. 14, 2020].
Marotta Antonio et al: "On the energy cost of robustness for green virtual network function placement in 56 virtualized infrastructures", ARXIV, vol. 125, pp. 64-75, XP085201655, ISSN: 1389-1286, DOI: 10.1016/J.COMNET.2017.04.045

(Continued)

*Primary Examiner* — Joseph R Maniwang
(74) *Attorney, Agent, or Firm* — IPUSA, PLLC

(57) ABSTRACT

A control apparatus for allocating a virtual network to a physical network is disclosed. The control apparatus includes a processor, and a memory storing instructions, which when executed, cause the processor to execute a process including performing allocation of virtual nodes configuring the virtual network to physical nodes or determination of paths between the virtual nodes, based on a prediction value of an amount of traffic of a service, a prediction value of an amount of power consumption of a physical node, information relating to the physical network, and a command value relating to power supply-demand match.

6 Claims, 5 Drawing Sheets

(56) References Cited

OTHER PUBLICATIONS

Jahani Arezoo et al: "EE-CTA: Energy efficient, concurrent and topology-aware virtual network embedding as a multi-objective optimization problem", Computer Standards & Interfaces, Elsevier Sequoia, Lausanne, CH, vol. 66, Apr. 27, 2019 (Apr. 27, 2019), XP085742973, ISSN: 0920-5489, DOI: 10.1016/J.CSI.2019.04.010 [retrieved on Apr. 27, 2019].

Blanco Bego et al: "A Robust Optimization Based Energy-Aware Virtual Network Function Placement Proposal for Small Cell 5G Networks with Mobile Edge Computing Capabilities", Hindawi, Mobile Information Systems, vol. 2017, Jan. 1, 2017 (Jan. 1, 2017), pp. 1-14, XP093361479, Netherlands, ISSN: 1574-017X, DOI: 10.1155/2017/2603410 Retrieved fromthe Internet: URL:http://downloads.hindawi.com/journals/misy/2017/2603410.xml.

* cited by examiner

Fig. 1

CONTROL APPARATUS, CONTROL METHOD AND PROGRAM

TECHNICAL FIELD

The present invention relates to a control apparatus, a control method, and a program.

BACKGROUND ART

In recent years, with the development of network function visualization (NFV) which is a virtualization technique, it is possible to provide a vast variety of network services by flexibly combining a wide variety of virtual network resources (VR: Virtual Resource) and virtual network functions (VNFs). In order to provide such services, appropriately allocating VRs and VNFs to physical resources for each service is required. In addition, appropriately determining the end-to-end path for sending the service to ensure desired communication performance (for example, communication delay time or the like) is required. For this reason, many control methods for VNF allocation and path determination under an NFV environment have been studied and reported.

Incidentally, in recent years, there has been a worldwide movement to introduce renewable energy to reduce the environmental load. As problems in operating a virtual network using renewable energy, there is the fact that it is impossible to supply the desired power generation amount which matches the demand amount, resulting in oversupply or undersupply due to the uncertainty of the weather. On the other hand, for example, NPL 1 proposes a virtual network control method which robustly prevents oversupply or undersupply on the assumption that there is uncertainty in the amount of traffic as well as the amount of electricity from renewable energy.

CITATION LIST

Patent Literature

[NPL 1] Kengo URATA, Ryota NAKAMURA, Shigeaki HARADA, Robust VNF Allocation in Virtual Networks under Uncertainty of Traffic Demands and Renewable Energy Resources, IEICE Technical Report, vol. 120, No. 414, IN2020-57, pp. 19-24, March 2021.

SUMMARY OF INVENTION

Technical Problem

However, the method proposed in the above-described NPL 1 does not perform virtual network control under the condition in which any command relating to an amount of power consumption is provided based on the premise of adjusting the closed supply and demand balance within the virtual network.

For example, the case in which a power system (micro-grid) which operates a virtual network cooperates with the power grid and receives a request for demand response is considered. At this time, although it is necessary to generate surplus electricity in the region which has received the command in the communication network, the method proposed in the above-described NPL 1 is based on the premise of preventing oversupply, and thus cannot satisfy that request.

Also, for example, the case in which a telecommunications network operator enters the electricity market is considered. In this case, it is assumed that, for each power sales transaction, an appropriate amount of power to be sold will be determined according to the bid price in the market. On the premise of this, the method proposed in the above-described NPL 1 cannot generate surplus power sufficient to generate the amount of power sold and it is considered that an economic loss may occur.

Therefore, it is considered necessary to make VNF allocation and routing robust against uncertainties in both an amount of traffic and renewable energy when given any command relating to an amount of power consumption in the communication network.

An embodiment of the present invention was made in view of the above points, and an object of the present invention is to implement virtual network control which is robust against the uncertainties of the amount of traffic and the uncertainties of renewable energy and which satisfies commands relating to an amount of power consumption.

Solution to Problem

In order to achieve the above object, a control apparatus according to an embodiment is a control apparatus for embedding a virtual network in a physical network, the virtual network enabling service provision, the control apparatus including: a first acquisition part configured to acquire a prediction value of an amount of traffic of a service and a prediction value of an amount of power consumption of a physical node to which a command value relating to the amount of power consumption is not provided, from among physical nodes configuring a physical network; a second acquisition part configured to acquire information relating to the physical network; a third acquisition part configured to acquire the command value provided to at least some of physical nodes configuring the physical network; a solution calculation part configured to calculate an optimal solution to a 2-stage robust optimization problem relating to allocation of virtual nodes configuring the virtual network to physical nodes and determination of paths between the virtual nodes, with a constraint condition that an amount of power consumption of a physical node to which the command value is provided satisfies the command value, based on the prediction value of the amount of traffic, the prediction value of the amount of power consumption, information relating to the physical network, and the command value; and a control part configured to control a virtual network embedded in the physical network, based on allocation of the virtual node and determination of a path represented by the optimal solution.

Advantageous Effects of Invention

It is possible to realize virtual network control which is robust to the uncertainties of the amount of traffic and the uncertainties of renewable energy and satisfies commands relating to an amount of power consumption.

BRIEF DESCRIPTION OF DRAWINGS

FIG. 1 is a diagram for explaining an example of embedding a service into a physical network.

DESCRIPTION OF EMBODIMENTS

Figure 2:
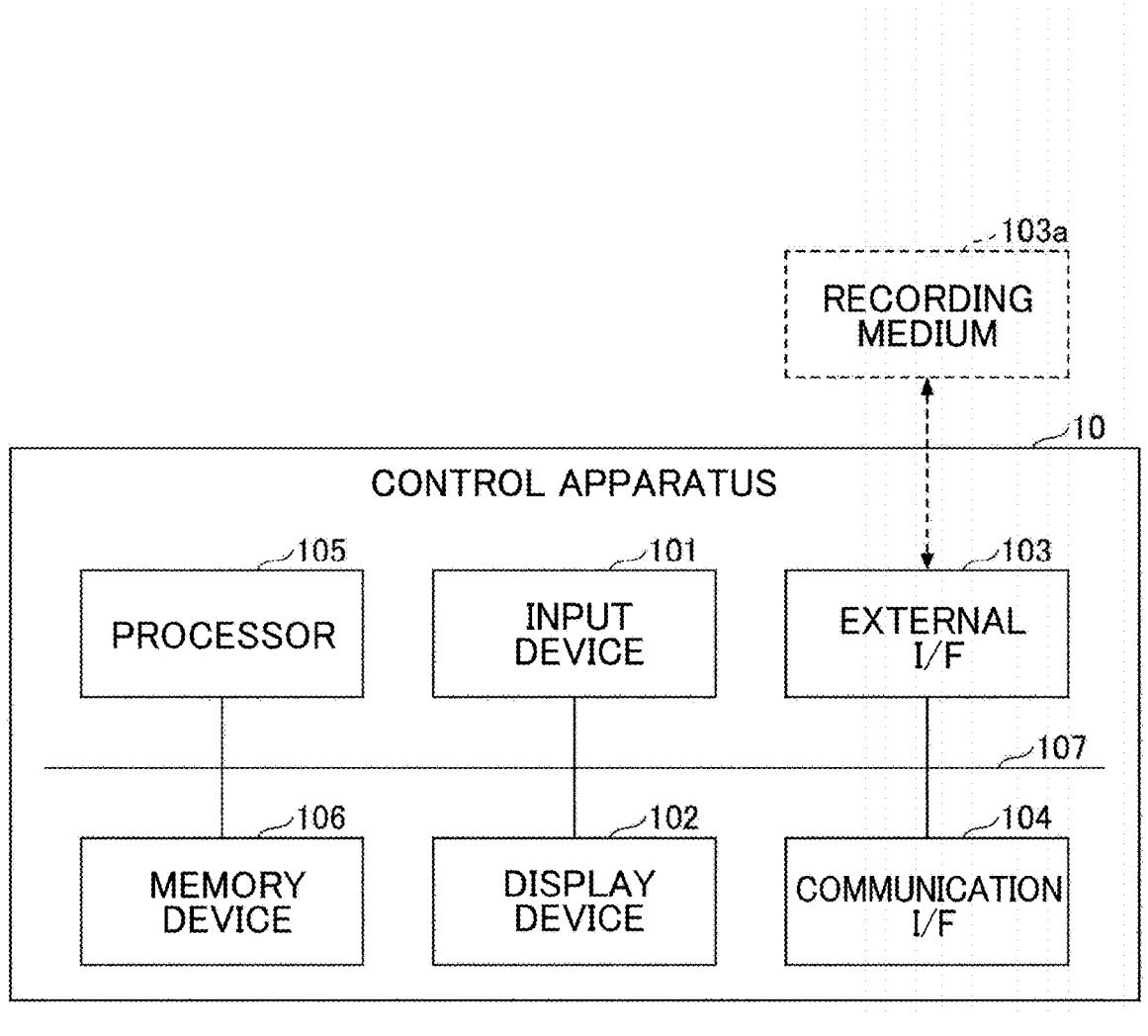
FIG. 2 is a diagram illustrating an example of a hardware configuration of a control apparatus according to an embodiment.

An embodiment of the present invention will be described below. In the embodiment, a control apparatus 10 which is capable of realizing virtual network control (VNF allocation and path determination) which is robust against the uncertainties of the amount of traffic and the uncertainties of renewable energy and satisfies commands relating to an amount of power consumption will be described. Here, hereinafter, in order to distinguish it from a virtual network, a network composed of physical nodes and physical links which require power will also be referred to as a physical network. On the other hand, a network in which VNFs are virtual nodes and routes between VNFs are virtual links is also called a virtual network. Furthermore, it is assumed that the physical nodes are, for example, bases such as data centers and that command values relating to an amount of power consumption are provided to at least some of the physical nodes in the physical network. Note that the command value relating to an amount of power consumption is a command specifying the power consumption of the physical node. Such a command value is provided to the physical node, for example, in response to a request for demand response, a request to secure the amount of power to be sold, or the like to secure the amount of power required for satisfying the request.

<Theoretical Configuration>

The theoretical configuration of the embodiment will be explained below.

A virtual network defined by a combination of a starting point (for example, a site having a user accommodated therein) and an end point (for example, a site in which a server is installed) and a VNF (for example, firewall or the like) used at the time of providing a service is equated with a service provided using this virtual network (service function chaining: SFC) and the problem of embedding $N_s$ services into a physical network is considered. That is to say, the problem of embedding $N_s$ virtual networks, each providing $N_s$ services, into a physical network is considered. Here, a virtual link can be divided into any number of paths and can be embedded in one or more physical links connected to a physical node at any ratio.

It is assumed that the topology of the physical network is expressed as g(N,L), N represents a set of physical nodes, and L represents a set of physical links. In addition, it is assumed that $I_n \subseteq L$ is a set of physical links flowing into physical node $n \in N$ and $O_n \subseteq L$ is a set of physical links flowing out from physical node $n \in N$. Also, it is assumed that S is a set of services and V is a set relating to a type of VNF. It is assumed that $N_r \subseteq N$ is a set of physical nodes to which a command value relating to an amount of power consumption is provided, $$\overline{\mathcal{N}_r} \subseteq \mathcal{N} \qquad \text{[Math. 1]}$$

is a set of physical nodes to which a command value relating to power consumption is not provided, and $p_n$ is a command value relating to an amount of power consumption for a physical node $n \in N_r$. Note that, although g, N, L, S, V, and the like should be written in script letters (cursive), unless this would result in misunderstanding, they will be written in normal letters in the text of the specification. Similarly, although $O_n$ and $I_n$ are written in blackboard bold letters (outlined letters), they are shown in normal letters in the text of the specification unless misunderstandings occur. The same applies to other cursive characters and outline characters.

At this time, each service is written as $g(V_s, E_s)$. $V_s \subseteq V$ is a VNF set of the s-th service and $E_s$ is a virtual link set of the sth service. Note that it is assumed that V also includes the start point node and the end point node of the service.

In addition, the virtual link $e \in E_s$ of the s-th service is also expressed interchangeably as $(V_{\varepsilon o}, V_d)$. Here, $V_{\varepsilon o}$ represents a start node of virtual link e and $v_d$ represents an end node of virtual link e.

Figure 1:
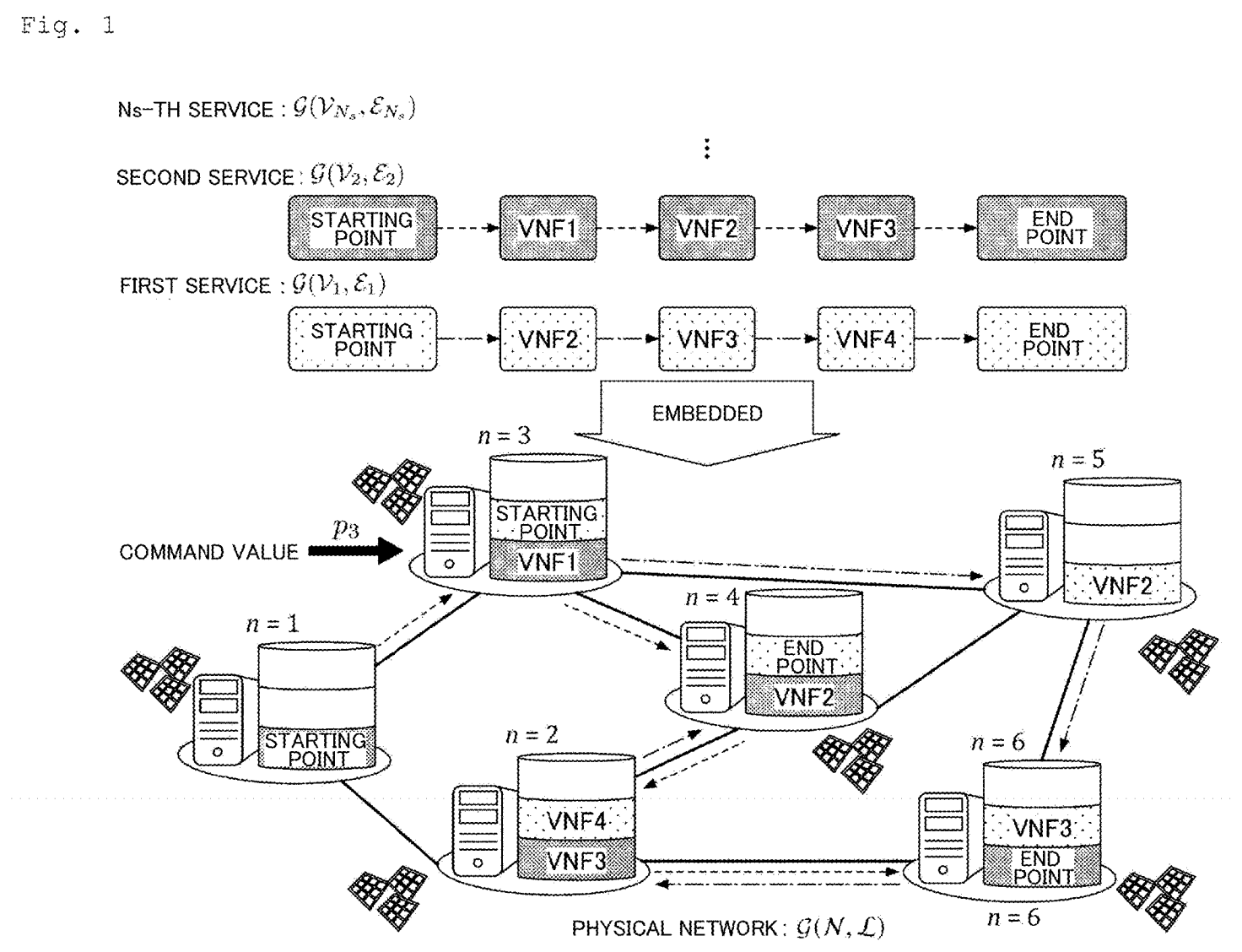

FIG. 1 shows an example of embedding a service in a physical network. The example shown in FIG. 1 shows a case in which a first service $g(V_1, E_1)$ composed of start point→VNF2→VNF3→VNF4→end point, a second service $g(V_2, E_2)$ composed of start point→VNF1→VNF2→VNF3→end point, and the like are embedded in a physical network g(N,L). Specifically, the first service g $(V_1, E_1)$ is embedded in physical node 3→physical node 5→physical node 6→physical node 2→physical node 4. Similarly, the second service $g(V_2, E_2)$ is embedded in physical node 1→physical node 3→physical node 4→physical node 2→physical node 6.

It is assumed that $\lambda_s$ is an amount of traffic generated by the sth service (hereinafter also referred to as a "service s"). The amount of traffic $\lambda_s$ includes, for example, the data transfer rate bps. When performing future VNF allocation and path determination, it is assumed that the amount of traffic $\lambda_s$ will be obtained as a prediction value using some kind of prediction method. That is to say, it is necessary to consider the embedding problem of the virtual network, based on the uncertainty of the prediction value of the amount of traffic $\lambda_s$. Note that, although various methods can be considered for predicting the amount of traffic $\lambda_s$, for example, a method of building a time series model such as an autoregressive model which predicts a future amount of traffic from time series data of a past amount of traffic and obtaining a prediction value of a future amount of traffic from this time series model is exemplified. In addition, for example, a method of using the average and variance of the amount of traffic for the past several days as prediction values can be considered.

Furthermore, renewable energy and contracted power are assumed to be the power sources supplied to each physical node. Since the amount of power supplied by renewable energy is affected by the natural environment or the like, there is uncertainty in the prediction value. For this reason, there is also uncertainty in the maximum amount of power un which is expected to be used by each physical node n (hereinafter referred to as a "maximum amount of power to be used"). That is to say, it is necessary to consider the problem of embedding a virtual network, taking into account the uncertainty of the maximum amount of power to be used un. In the following, it is assumed that there is uncertainty in the maximum amount of power consumption of a physical node for which a command value for an amount of power consumption is not provided, that is, $$\mu_n (n \in \overline{\mathcal{N}_r}) \qquad \text{[Math. 2]}$$

Under the above assumptions, a robust virtual network embedding problem against uncertainties of the amount of traffic and uncertainties of renewable energy is formulated. In order to prepare for this, first, the uncertainty of the amount of traffic and the uncertainty of the maximum amount of power to be used by each physical node are described as the following polyhedron set.

[Math. 3], $$\Lambda_s := \left\{ \lambda_s := \overline{\lambda}_s + \zeta_s \Delta \lambda_s : -1 \le \zeta_s \le 1, \sum_{s \in S} |\zeta_s| \le \gamma_\lambda \right\} \quad (1)$$

$$\mathcal{M}_n := \left\{ \mu_n := \overline{\mu}_n + \zeta_n \Delta \mu_n : -1 \le \zeta_n \le 1, \sum_{n \in \mathcal{N}_r} |\zeta_n| \le \gamma_\mu \right\} \quad (2)$$

where,

[Math. 4]

$$\overline{\lambda}_s \in \mathbb{R}_+$$

represents the nominal value of traffic generated using the service s and $$\mu_n \in \mathbb{R}_+ \quad \text{[Math. 5]}$$

represents the nominal value of the maximum amount of power to be used using the physical node n. Here, the nominal value refers to a reference value, and for example, a statistical index such as an average value or a median value may be used. Also, $\Delta\lambda_s \in \mathbb{R}_+$ is the deviation from the nominal value of the amount of traffic generated using the service s and $\Delta\mu_n \in \mathbb{R}_+$ is the deviation from the nominal value of the maximum amount of power consumption of the physical node n which are parameters describing uncertainty.

In the above uncertainty set (1), the parameter $\gamma_\lambda$ is a parameter which adjusts how much deviation exists from the nominal value. Similarly, in the uncertainty set (2) above, the parameter $\gamma_\mu$ is a parameter that adjusts how much deviation from the nominal value exists. These parameters $\gamma_\lambda$ and $\gamma_\mu$ can also be said to be parameters which define the size of the uncertainty set.

With the above preparations, a virtual network embedding problem which minimizes the total cost of the entire virtual network with respect to the uncertainty of the amount of traffic and the uncertainty of the maximum amount of power to be used by physical nodes described by the above uncertainty sets (1) and (2) is formulated as the following 2-stage robust optimization problem.

[Math. 6]

$$\min_{x_n^{v,s}} \max_{\mu_n \in \mathcal{M}_n} f_1(x_n^{v,s}) + \max_{\lambda_s \in \Lambda_s} \min_{y_\ell^{e,s} \in \mathcal{Y}(\lambda_s, x_n^{v,s})} f_2(y_\ell^{e,s}) \quad (3a)$$

$$\text{s.t.} \sum_{s \in S} \sum_{v \in \mathcal{V}_s} d_n^{v,s} x_n^{v,s} = p_n, \quad \forall\, n \in \mathcal{N}_r \quad (3b)$$

$$\sum_{s \in S} \sum_{v \in \mathcal{V}_s} d_n^{v,s} x_n^{v,s} \le \mu_n, \quad \forall\, n \in \overline{\mathcal{N}_r} \quad (3c)$$

$$\sum_{n \in \mathcal{N}} x_n^{v,s} = 1, \quad \forall\, v \in \mathcal{V}_s, \forall\, s \in S \quad (3d)$$

$$\sum_{v \in \mathcal{V}_s} x_n^{v,s} \le 1, \quad \forall\, n \in \mathcal{N}, \forall\, s \in S \quad (3e)$$

$$x_n^{v,s} \in \{0,1\}, \quad \forall\, n \in \mathcal{N}, \forall\, v \in \mathcal{V}_s, \forall\, s \in S \quad (3f)$$

Here, $x_n^{v,s}$ is a binary variable, which takes 1 in a case in which VNF $v \in V_s$ of service s is assigned to the physical node $n \in N$ and 0 in the other cases. Note that assigning a VNF to a physical node may be expressed as "arranging a VNF on a physical node".

Furthermore, $y_\ell^{e,s} \in R$ (1 is a lowercase letter L) is a continuous variable which takes a value from 0 to 1 and represents the ratio of embedding the virtual link $e \in E_s$ of the service s into the physical link $l \in L$. In the objective function (3a), $f_1(x_n^{v,\epsilon})$ and $f_2(y_1^{e,\epsilon})$ are functions defined below.

[Math. 7]

$$f_1(x_n^{v,s}) := \max_{n \in \overline{\mathcal{N}_r}} \frac{1}{\mu_n} \sum_{s \in S} \sum_{v \in \mathcal{V}_s} d_n^{v,s} x_n^{v,s} \quad (4a)$$

$$f_2(y_\ell^{e,s}) := \max_{\ell \in \mathcal{L}} \frac{1}{\phi_\ell} \sum_{s \in S} \sum_{e \in \mathcal{E}_s} \lambda_s y_\ell^{e,s} \quad (4b)$$

The above $f_1(x_n^{v,s})$ represents the node power congestion rate and $f_2(y_1^{e,s})$ represents the link congestion rate.

Equation (3b) represents the power consumption constraint at a physical node given a command value relating to an amount of power consumption and $d_n^{v,s}$ is the power consumption coefficient when VNF $v \in V_s$ in service s is assigned to physical node n. Note that, although Expression (3b) is an equation and assumes that the amount of power consumption on the left side completely matches the command value $p_n$, the present invention is not limited thereto. In addition, for example, the inequality may be provided so that the power consumption on the left side falls within a certain range (that is, falls within certain upper and lower limit values). Thus, even when using a relaxed command value such as suppressing the amount of power consumption within a certain range (for example, command value with upper and lower limits designated for an amount of energy consumption) as the command value relating to the power consumption, this embodiment can be similarly applied.

Inequation (3c) represents a constraint on the maximum amount of power to be used in a physical node to which a command value relating to an amount of power consumption is not provided. Equation (3d) expresses that each VNF of each service can only be assigned to one physical node. On the other hand, Inequation (3e) means that a plurality of VNFs cannot be assigned to one physical node in one service. Note that, although the constraint conditions of (3e) are seemingly severe and seems to narrow the scope of practical application, it becomes possible to assign two or more VNFs to one physical node, for example, by treating a combination of two or more VNFs to be assigned to a certain physical node as one new VNF.

Furthermore, a set $y(\lambda_s, x_n^{v,s})$ of $y_1^{e,s}$ which can be obtained when the amount of traffic $\lambda_s$ and $x_n^{v,s}$ are fixed is described as follows:

[Math. 8]

$$y(\lambda_s, x_n^{v,s}) := \{ y_\ell^{e,s} : 0 \le y_\ell^{e,s} \le 1, \quad (5a)$$
$$\forall\, n \in \mathcal{N}, \forall\, e \in \mathcal{E}_s, \forall\, s \in S, (5b), (5c) \text{ and } (5d) \text{ hold} \}$$

$$\sum_{s \in S} \sum_{e \in \mathcal{E}_s} \lambda_s y_\ell^{e,s} \le \phi_\ell, \quad \forall\, \ell \in \mathcal{L} \quad (5b)$$

$$\sum_{\ell \in \mathcal{L}} \sum_{e \in \mathcal{E}_s} q_\ell^{e,s} y_\ell^{e,s} \le T, \quad \forall\, s \in S \quad (5c)$$

$$\sum_{\ell \in O_n} y_\ell^{e,s} - \sum_{\ell \in I_n} y_\ell^{e,s} = x_n^{v_{so},s} - x_n^{v_{d},s}, \quad \forall\, n \in \mathcal{N}, \forall\, e \in \mathcal{E}_s, \forall\, s \in S \quad (5d)$$

Here, Inequation (5b) is a capacity constraint for physical links and $\varphi_l$ (l is lower case L) represents the maximum capacity of physical link $l \in L$. Furthermore, Inequation (5c) is a constraint relating to the delay time required for processing each service s, in which $q_l^{e,s}$ represents a delay time coefficient and T represents an upper limit value of delay time.

The solutions of the 2-stage robust optimization problems formulated in (3a) to (3f) and (5a) to (5d) are calculated in two stages. First, in the first stage, VNF allocation $x_n^{v,s}$ which minimizes the node power congestion rate $f_1(x_n^{v,s})$ is determined for a scenario of a case in which the amount of traffic $\lambda_s$ is unknown and the maximum amount of power to be $\mu_n$ is the worst. In the second stage, the virtual link embedding ratio $y_1^{e,s}$ (that is, path) which minimizes the link congestion rate $f_2(y_1^{e,s})$ is determined, in which the amount of traffic $\lambda_s$ is known. Thus, it is possible to obtain a control solution (that is, VNF allocation $x_n^{v,s}$ and path determination $y_1^{e,s}$) which is robust to the uncertainties of the amount of traffic and the uncertainties of renewable energy and satisfies the command relating to an amount of power consumption. The specific solution procedure will be explained below.

A solution algorithm for the 2-stage robust optimization problem formulated in (3a) to (3f) and (5a) to (5d) is constructed, based on the column-and-constraint generation (C&CG) method. This C&CG method is an algorithm which obtains the solution of the original problem by decomposing the original problem into a master problem and a sub-problem and solving them alternately. Note that (3a) to (3f) are hereinafter collectively described as (3). Similarly, (5a) to (5d) are collectively described as (5). The same method needs to be used for other formula numbers when a plurality of expression numbers are described together.

The master problem in Step K is defined as follows.

[Math. 9]

$$\min_{x_n^{v,s}, r_1 > 0} r_1 \tag{6a}$$

$$\text{s.t. } r_1 \geq \frac{1}{\overline{\mu}_n - \Delta\mu_n} \sum_{s \in S} \sum_{v \in V_s} d_n^{v,s} x_n^{v,s} + \frac{1}{\phi_l} \sum_{s \in S} \sum_{e \in \mathcal{E}_s} \lambda_s(k) y_l^{e,s}(k), \tag{6b}$$

$$\forall n \in \mathcal{N}, \forall k \in \mathcal{K}$$

$$\sum_{s \in S} \sum_{e \in \mathcal{E}_s} \lambda_s(k) y_l^{e,s}(k) \leq \phi_l, \forall l \in \mathcal{L}, \forall k \in \mathcal{K} \tag{6c}$$

$$\sum_{l \in \mathcal{L}} \sum_{e \in \mathcal{E}_s} q_l^{e,s} y_l^{e,s}(k) \leq T, \forall s \in \mathcal{S}, \forall k \in \mathcal{K} \tag{6d}$$

$$\sum_{l \in 0_n} y_l^{e,s}(k) - \sum_{l \in 1_n} y_l^{e,s}(k) = x_n^{v_{so},s} - x_n^{v_{d},s}, \forall n \in \mathcal{N}, \forall e \in \mathcal{E}_s, \tag{6e}$$

$$\forall s \in \mathcal{S}, \forall k \in \mathcal{K} \text{ (3b), (3c), (3d), (3e), and (3f) hold}$$

Here, in the above problem, $\lambda_s(k)$ is the solution of the subproblem (which will be described later) obtained up to Step K−1. In addition, K in cursive is as follows:

[Math. 10]

$$\mathcal{K} := \{1, 2, \ldots K - 1\}.$$

Hereinafter, it is assumed that the optimal solution of the master problem is $x_n^{*v,s}(K)$, $r_1^*(K)$ and the lower bound for the optimal solution of original problems (3) and (5) is $\psi_{LB}(K)$. At this time,

[Math. 11]

$$\psi_{LB}(K) = r_1^*(K)$$

is established. $x_n^{*v,s}(K)$ found in the master problem is used in the sub-problem in Step K. Also, note that, in the master problem, $y_1^{e,s}(k)$ is also solved as a decision variable.

Next, the sub-problem in Step K is defined as follows.

[Math. 12]

$$\max_{\lambda_s \in \Lambda_s} \min_{y_l^{e,s} \in \mathcal{Y}(\lambda_s, x_n^{*v,s}(K))} f_2(y_l^{e,s}) \tag{7}$$

In the above problem, it is assumed that there exists an optimal value $(\lambda_s^*(K), y_1^{*e,s}(K))$ such that the objective function has a finite value. That is to say, it is assumed that sub-problem (7) is executable for any solution of the master problem. Note that, when the sub-problem (7) is infeasible for some solution of the master problem, for example, the control apparatus 10 may output information indicating that the virtual network cannot be embedded.

The sub-problem (7) above is a bilevel optimization problem and the objective function is not linear. Thus, it is difficult to solve it in of a current form thereof. Thus, in order to avoid this, first, by converting $f_2(y_1^{e,s})$ which is the maximum value acquisition function into a linear constraint,

[Math. 13]

$$\max_{\lambda_s \in \Lambda_s} \min_{y_l^{e,s} \in \mathcal{Y}(\lambda_s, x_n^{*v,s}(K)), r_2 > 0} r_2 \text{ s.t. } r_2 \geq \frac{1}{\phi_l} \sum_{s \in S} \sum_{e \in \mathcal{E}_s} \lambda_s y_l^{e,s}, \forall l \in \mathcal{L} \tag{8}$$

is obtained. Furthermore, the inner minimization problem in the sub-problem (7) is converted into a dual problem, resulting in the following single-level maximization problem.

[Math. 14]

$$\max_{\lambda_s \in \Lambda_s, \pi_{1,l}, \pi_{2,l}, \pi_{3,l}, \xi_n^{e,s}, \theta_l^{e,s} \in \mathbb{R}} f_{sub}(\pi_{1,l}, \pi_{2,l}, \pi_{3,l}, \xi_n^{e,s}, \theta_l^{e,s}) \tag{9a}$$

$$\text{s.t. } \sum_{l \in \mathcal{L}} \pi_{1,l} \leq 1, \tag{9b}$$

$$g_{sub}(\lambda_s, \pi_{1,l}, \pi_{2,l}, \pi_{3,l}, \xi_n^{e,s}, \theta_l^{e,s}) \geq 0, \forall n \in \mathcal{N}, \forall e \in \mathcal{E}_s, \forall s \in \mathcal{S}, \tag{9c}$$

$$\pi_{1,l}, \pi_{2,l} \geq 0, \forall l \in \mathcal{L}, \pi_{3,s} \geq 0, \forall s \in \mathcal{S}, \theta_l^{e,s} \geq 0, \forall n \in \mathcal{N}, \forall e \in \mathcal{E}_s, \forall s \in \mathcal{S}$$

-continued where,

[Math. 15]

$$f_{sub}(\pi_{1,\ell}, \pi_{2,\ell}, \pi_{3,\ell}, \xi_n^{e,s}, \theta_\ell^{e,s}) :=$$

$$-\sum_{\ell \in \mathcal{L}} \pi_{2,\ell} \phi_\ell - T \sum_{s \in S} \pi_{3,s} + \sum_{s \in S} \sum_{e \in \mathcal{E}_s} \sum_{n \in N} \xi_n^{e,s} \left( x_n^{v_{so},s} - x_n^{v_d,s} \right) - \sum_{s \in S} \sum_{\ell \in \mathcal{L}} \sum_{e \in \mathcal{E}_s} \theta_\ell^{e,s}$$

$$g_{sub}(\lambda_s, \pi_{1,\ell}, \pi_{2,\ell}, \pi_{3,\ell}, \xi_n^{e,s}, \theta_\ell^{e,s}) := \sum_{\ell \in \mathcal{L}} \frac{\pi_{1,\ell} \lambda_s}{\phi_\ell} + \sum_{\ell \in \mathcal{L}} \pi_{2,\ell} \lambda_s + \sum_{s \in S} \pi_{3,s} q_\ell^{e,s} - \xi_n^{e,s} \left( \sum_{\ell \in \mathcal{O}_n} y_\ell^{e,s} - \sum_{\ell \in \mathcal{I}_n} y_\ell^{e,s} \right)$$

is provided.

In the above maximization problem (9), $\pi_{1,\ell}$, $\pi_{2,\ell}$, $\pi_{3,\ell}$, $\xi_n^{e,s}$, and $\theta_\ell^{e,s}$ represent the constraint conditions of (8), (5b), (5c), (5d), and dual variables for $y_\ell^{e,s} \leq 1$, respectively. The optimization problem (9) is a non-linear optimization problem because there is a product of $\lambda_s$ and $\pi_{1,\ell}$ and a product of $\lambda_s$ and $\pi_{2,\ell}$. In this embodiment, the maximization problem (9) is solved using the principal-dual interior point method.

Hereinafter, the optimal solution to the maximization problem (9) will be $\lambda_s^*(K)$ and the objective function value corresponding to this optimal solution will be Q(K). At this time, the upper bound of the optimal solution of the original problem (3) is defined as $\omega_{UB}(K)$, and

[Math. 16]

$$\psi_{UB}(K) = \sum_{s \in S} \sum_{n \in N} \sum_{v \in \mathcal{V}_s} c_n^{v,s} x_n^{*v,s}(K) + Q(K)$$

is obtained.

By alternately and repeatedly solving the above master problem (6) and the sub-problem (9), it is guaranteed that the upper and lower bounds asymptotically converge to the optimal solution of the original problem (3).

<Hardware Configuration of Control Apparatus 10>

A hardware configuration of the control apparatus 10 according to the embodiment will be explained below with reference to FIG. 2. FIG. 2 is a diagram illustrating an example of the hardware configuration of the control apparatus 10 according to the present embodiment.

As illustrated in FIG. 2, the control apparatus 10 according to the embodiment is realized by the hardware configuration of a general computer or a computer system and includes an input device 101, a display device 102, an external I/F 103, a communication I/F 104, a processor 105, and a memory device 106. Each of these pieces of hardware is communicatively connected using a bus 107.

The input device 101 is, for example, a keyboard, a mouse, a touch panel, or the like. The display device 102 is, for example, a display or the like. Note that the control apparatus 10 may not include, for example, at least one of the input device 101 and the display device 102.

The external I/F 103 is an interface with an external device such as a recording medium 103a. The control apparatus 10 can read and write data on the recording medium 103a via the external I/F 103. Note that examples of the recording medium 103a include a compact disc (CD), a digital versatile disk (DVD), a secure digital (SD) memory card), and a universal serial bus (USB) memory card.

The communication I/F 104 is an interface through which the control apparatus 10 is connected to a communication network. Examples of the processor 105 include various arithmetic units such as a central processing unit (CPU) and a graphics processing unit (GPU). Examples of the memory device 106 includes various storage devices such as a hard disk drive (HDD), a solid state drive (SSD), a random access memory (RAM), a read only memory (ROM), and a flash memory.

By providing the hardware configuration illustrated in FIG. 2, the control apparatus 10 according to the embodiment can realize virtual network control processing which will be described later. Note that the hardware configuration illustrated in FIG. 2 is an example and the control apparatus 10 may have other hardware configurations. For example, the control apparatus 10 may have a plurality of processors 105, have a plurality of memory devices 106, and have various pieces of hardware (not shown).

<Functional Configuration of Control Apparatus 10>

Figure 3:
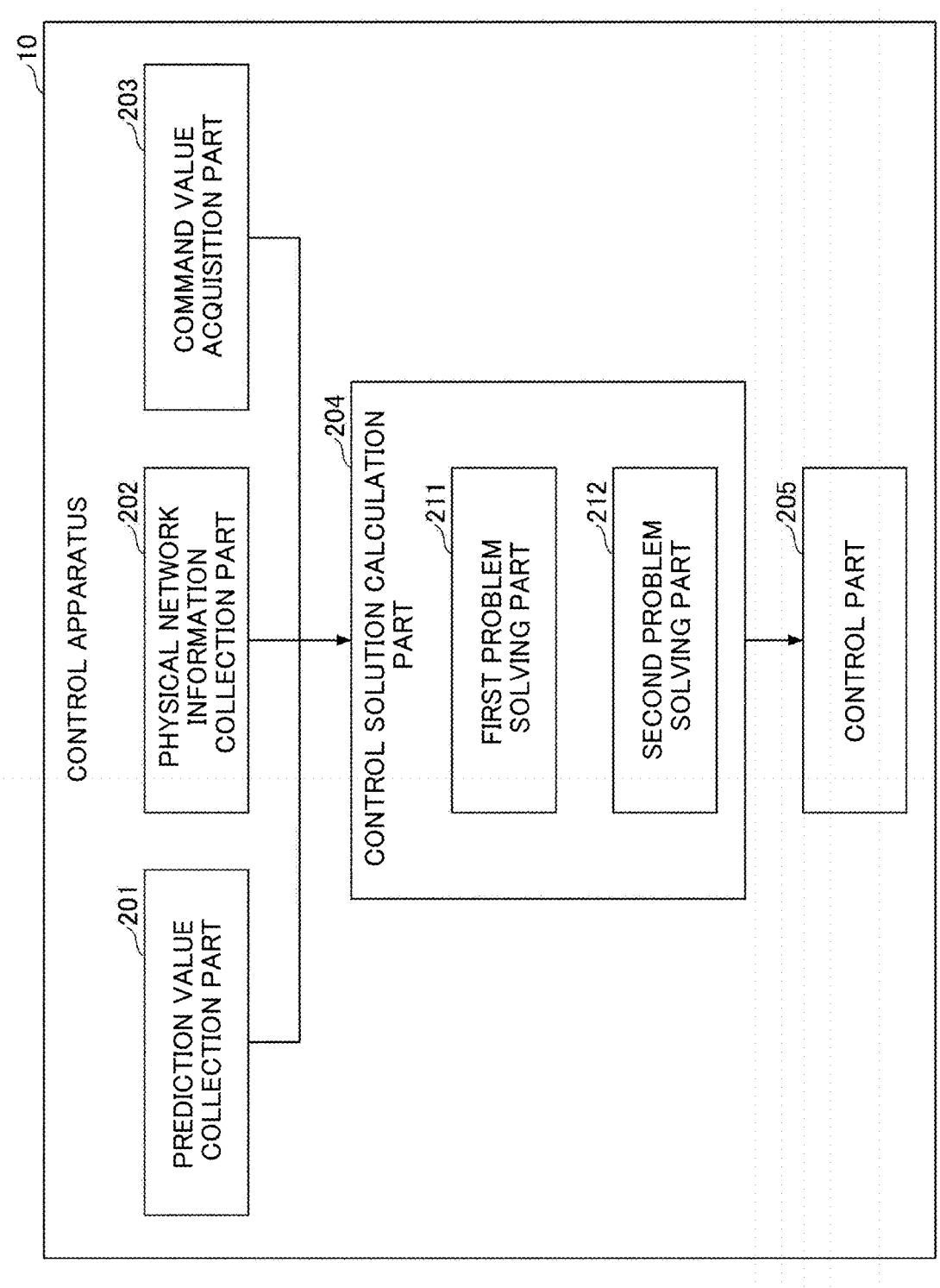
FIG. 3 is a diagram illustrating an example of a functional configuration of the control apparatus according to the embodiment

A functional configuration of the control apparatus 10 according to the embodiment will be described below with reference to FIG. 3. FIG. 3 is a diagram illustrating an example of the functional configuration of the control apparatus 10 according to the embodiment.

As illustrated in FIG. 3, the control apparatus 10 according to the embodiment has a prediction value collection part 201, a physical network information collection part 202, a command value acquisition part 203, a control solution calculation part 204, and a control part 205. Each of these parts is implemented by processing in which one or more programs installed in the control apparatus 10 cause the processor 105 to execute.

The prediction value collection part 201 collects a prediction value of an amount of traffic of each service and the prediction value of a maximum amount of power to be used in each physical node (here, a physical node to which a command value relating to the amount of power consumption is not provided). That is to say, the prediction value collection part 201 acquires a nominal value of the amount of traffic of each service and a deviation thereof and a nominal value of the maximum amount of power consumption and a deviation thereof in each physical node to which a command value relating to the amount of power consumption is not provided.

In the embodiment, it is assumed that the prediction value of the amount of traffic of each service and the prediction value of the maximum amount of power consumption in each physical node are obtained by a prediction algorithm or the like using a time-series model. For example, when scheduling VNF allocation and path determination for a future day, the prediction value collection part 201 acquires the prediction value of the amount of traffic up to one day ahead and the prediction value of the maximum amount of power consumption using some kind of prediction algorithm. Here, it is assumed that these prediction values correspond to an average value and a variance of a certain sampling interval. In this case, the average value may be set as the nominal value and the variance may be set as the deviation of the nominal value. Note that the sampling interval is a time interval such as one minute or one hour which is preset in accordance with control specifications for VNF allocation and path determination.

Note that the nominal value and a deviation thereof collected using the prediction value collection part 201 are passed to the control solution calculation part 204.

The physical network information collection part 202 collects information relating to the topology of the physical network and various parameters (for example, power consumption coefficient or the like).

Note that the information and various parameters collected using the physical network information collection part 202 are passed to the control solution calculation part 204.

The command value acquisition part 203 acquires a command value relating to an amount of power consumption. That is to say, the command value acquisition part 203 acquires information indicating a physical node to which a command value relating to an amount of power consumption is provided and the command value.

Note that the command value acquired using the command value acquisition part 203 is passed to the control solution calculation part 204.

The control solution calculation part 204 performs an algorithm to solve the 2-stage robust optimization problems (3) and (5) using the information collected using the prediction value collection part 201, the information collected using the physical network information collection part 202, and the command value acquired using the command value acquisition part 203. That is to say, the control solution calculation part 204 calculates the VNF allocation $x_n^{v,s}$ by alternately and repeatedly solving the master problem (6) and the sub-problem (9) in the first step, and then calculates the path determination $y_l^{e,s}$ by solving the sub-problem (7) in the second stage. Thus, the VNF allocation $x_n^{v,s}$ and the path determination $y_l^{e,s}$ representing the optimal control solution of the original problems (3) and (5) are obtained.

Here, the control solution calculation part 204 includes a first problem solving part 211 and a second problem solving part 212. The first problem solving part 211 calculates the solution to the master problem (6) and also calculates the lower bounds of the optimal solutions to the original problems (3) and (5). The second problem solving part 212 calculates the solutions of the sub-problem (9) and the sub-problem (7) and also calculates the upper bounds of the optimal solutions of the original problems (3) and (5). Note that, for example, when performing the above-mentioned scheduling, the control solution calculation part 204 can divide the 2-stage robust optimization problems (3) and (5) into each sampling time interval, and then perform the solution algorithm for each independently.

The control part 205 controls the virtual network using the control solution calculated using the control solution calculation part 204. Thus, the VNF allocation and the path determination represented by the optimal control solution are embedded in the physical network (that is, changed to the optimal VNF allocation and the path determination).

Note that, although a case in which the VNF allocation and the path determination are scheduled for one day in the future has been described as an example, this is one example of application and is not limited thereto. For example, it can be similarly applied when calculating optimal VNF allocation and paths in real time and dynamically controlling a virtual network. Specifically, for each sampling point, it is possible to collect the prediction value of the amount of traffic of each service and the prediction value of the maximum amount of power to be used at each physical node (here, for physical nodes for which a command value relating to an amount of power consumption is not provided). In addition, when a command value relating to power consumption can be obtained, the control solution calculation part 204 may perform a solution-finding algorithm each time the command value is collected/obtained and the control part 205 may update the VNF allocation and path.

<Virtual Network Control Processing>

Figure 4:
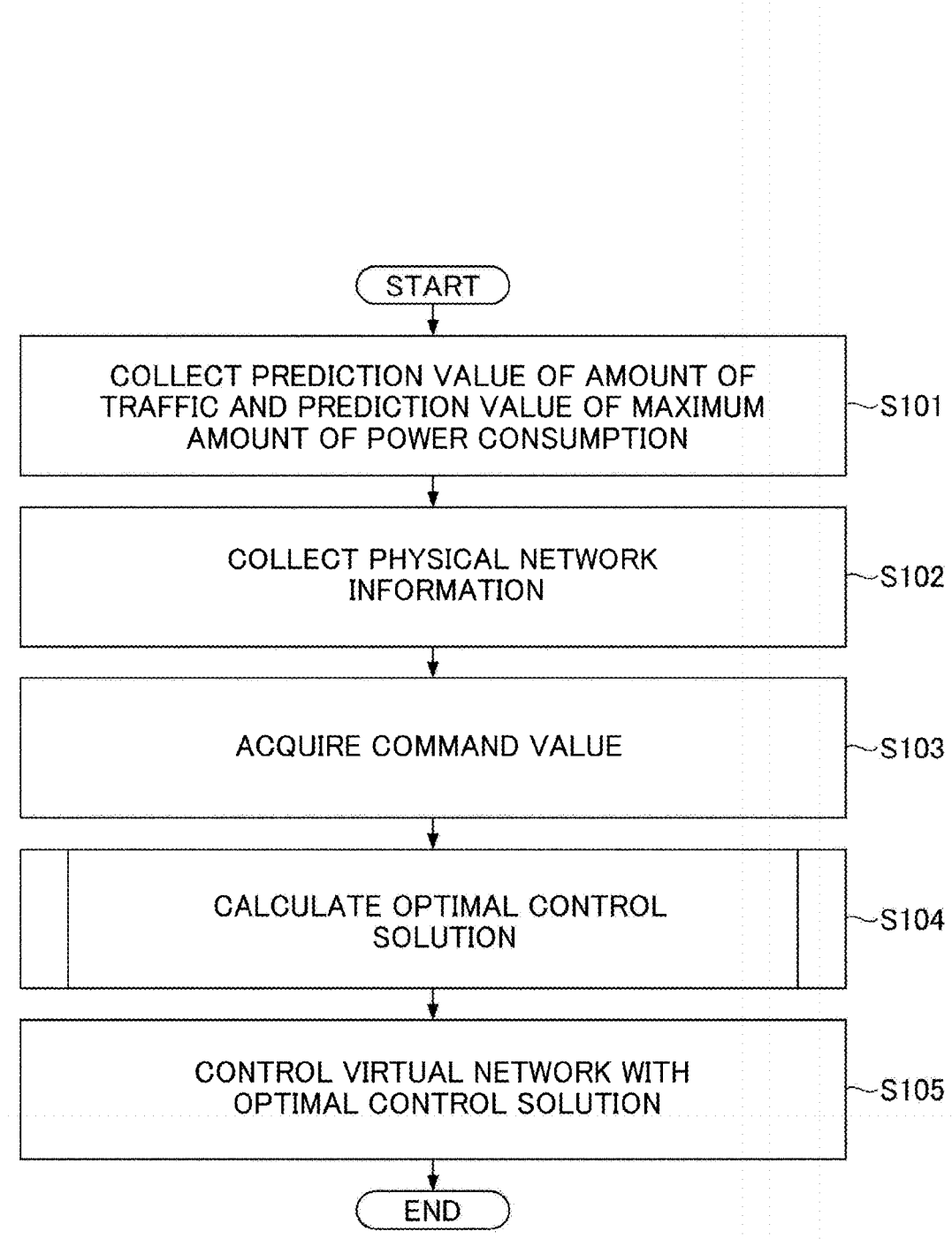
FIG. 4 is a flowchart for describing an example of a flow of virtual network control processing according to the embodiment.

A flow of virtual network control processing according to the embodiment will be described below with reference to FIG. 4. FIG. 4 is a flowchart for describing an example of the flow of the virtual network control processing according to the embodiment. Note that it is assumed that the service $g(V_s, E_s)$ (s=1, ..., $N_s$) to be embedded is provided to the control apparatus 10 in advance.

First, the prediction value collection part 201 collects a prediction value of the amount of traffic for each service (nominal value and a deviation thereof) and a prediction value of maximum power consumption (nominal value and a deviation thereof) for each physical node (physical nodes for which a command value relating to an amount of power consumption is not provided) (Step S101)

Subsequently, the physical network information collection part 202 collects information relating to the topology of the physical network and various parameters (for example, power consumption coefficient or the like) (Step S102). Here, when the topology of the physical network and the values of various parameters have not been changed since the last collection, this step may not be performed.

Subsequently, the command value acquisition part 203 acquires the command value for the physical node to which the command value relating to an amount of power consumption has been provided (Step S103).

Subsequently, the control solution calculation part 204 performs an algorithm for solving the 2-stage robust optimization problems (3) and (5) using the information collected or obtained in Steps S101 to S103 above and calculates the optimal control solution (Step S104). Note that details of this step will be described later.

Also, the control part 205 controls the virtual network using the control solution calculated in Step S104 above (Step S105).

Figure 5:
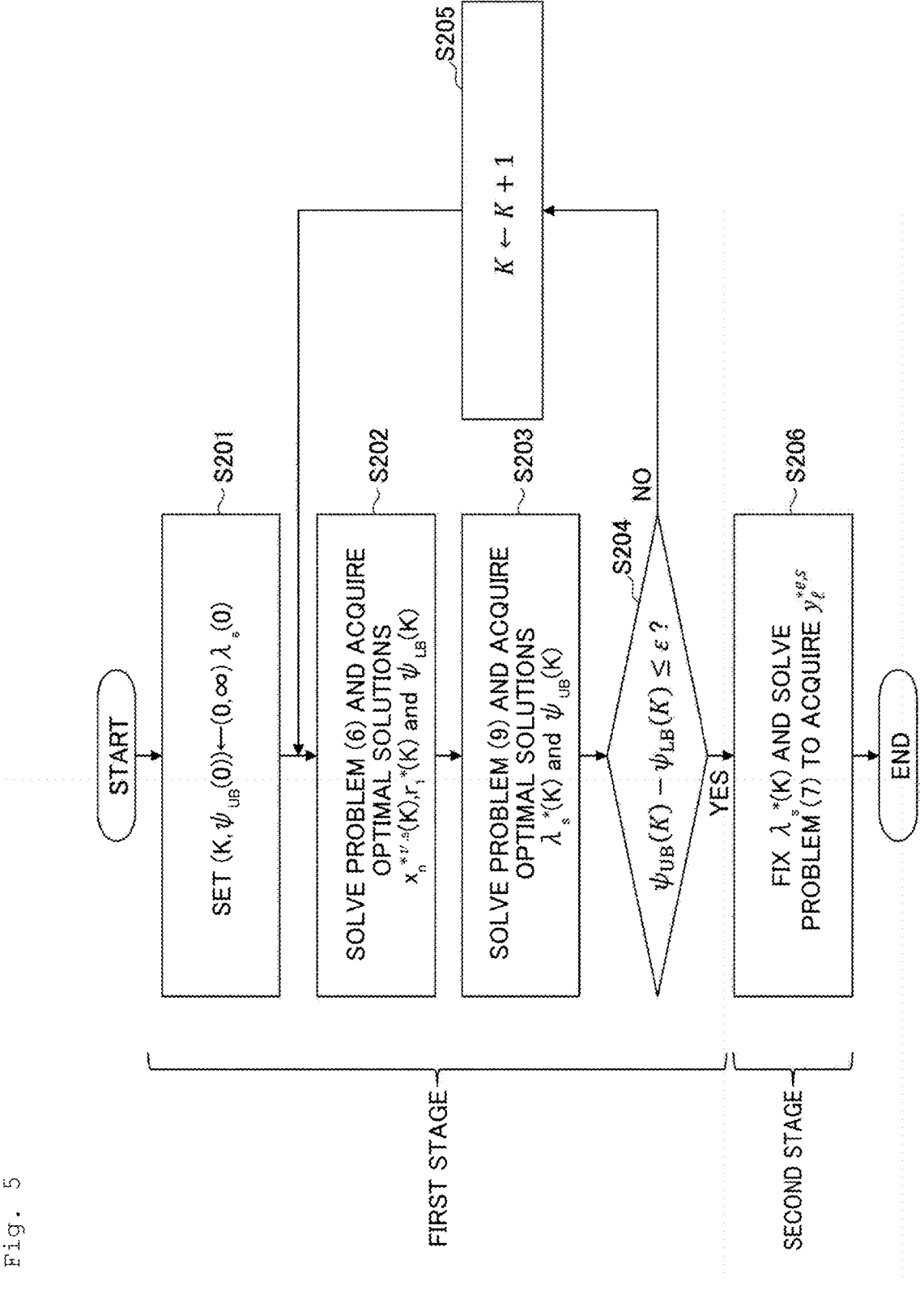
FIG. 5 is a flowchart for describing an example of a flow of control solution calculation processing according to the embodiment.

Here, details of the control solution calculation process in Step S104 will be described with reference to FIG. 5. FIG. 5 is a flowchart for describing an example of a flow of control solution calculation processing according to the embodiment.

First, the control solution calculation part 204 sets Step K=0 and $\omega_{UB}(0)=\infty$ and sets an initial value $\lambda_s(0)$ (Step S201). Note that the initial value $\lambda_s(0)$ may be set to any value belonging to $\kappa_s$. Furthermore, at this time, the parameter $\varepsilon > 0$ for determining the end condition of the first stage may be set to a finite value.

Subsequently, the control solution calculation part 204 solves the master problem (6) using the first problem solving part 211 and acquires the optimal solutions $x_n^{*v,s}(K), r_1^*(K)$, and $\omega_{LB}(K)$ (Step S202).

Subsequently, the control solution calculation part 204 uses the second problem solving part 212 to solve the sub-problem (9) and acquires the optimal solutions $\lambda_s^*(K)$ and $\psi_{UB}(K)$ (Step S203). At this time, the control solution calculation part 204 updates $\psi_{UB}(K)$ by $\psi_{UB}(K)=\min(\omega_{UB}(K), \psi_{UB}(K-1))$.

Subsequently, the control solution calculation part 204 uses a preset parameter ε (or the parameter ε set in Step S201 above) to determine whether $\psi_{UB}(K)-\psi_{LB}(K)\le\varepsilon$ is satisfied (Step S204).

When it is not determined in Step S204 that $\psi_{UB}(K)-\psi_{LB}$ (K)≤ε is satisfied, the control solution calculation part 204 updates Step K by adding 1 to Step K (Step S205) and returns to Step S202. Thus, Steps S202 to S203 are repeatedly performed until $\psi_{UB}(K)-\psi_{LB}(K)\le\varepsilon$ is satisfied.

On the other hand, when it is determined in Step S204 above that $\psi_{UB}(K)-\psi_{LB}(K)\le\varepsilon$ is satisfied, the control solution calculation part 204 fixes $\lambda_s^*(K)$, and then uses the second problem solving part 212 to solve the sub-problem (7) to acquire the optimal solution $y_1^{*e,s}$ (Step S206).

The optimal solutions $x_n^{*v,s}(K)$ and $y_1^{*e,s}$ are acquired from the above, and these become the optimal control solutions (optimal solutions) for the original problems (3) and (5). Note that, although it is necessary to solve subproblem (7) in Step S206 above, this optimization problem can be easily solved because it can be reduced to a simple linear programming problem relating to $y_1^{e,s}$.

SUMMARY

As described above, under the situation in which command values relating to an amount of power consumption are provided to at least some physical nodes in the physical network, the control apparatus 10 according to the embodiment can realize virtual network control (VNF allocation and path determination) which robustly satisfies command values against the uncertainties of the amount of traffic and the uncertainties of renewable energy.

In the virtual network control processing to realize the above virtual network control, VNEs are assigned and paths are determined by taking into account the fact that there are uncertainties in predictions relating to an amount of traffic and an amount of renewable energy power. Thus, it is possible to robustly prevent deterioration of communication performance and congestion which may occur due to the influence of prediction errors, increased costs due to purchasing insufficient power, and increased environmental burden due to a decline in the utilization rate of renewable energy. In addition, since it also satisfies the directive relating to an amount of power consumption, it becomes possible, for example, to respond to demand response requests or to generate the amount of power sold necessary for conducting power market transactions.

Furthermore, the virtual network control process (particularly the control solution calculation process) according to the embodiment is a solution algorithm based on the theory of mathematical optimization called 2-stage robust optimization. This theory performs two-step robust optimization based on a decision-making process and is known to yield solutions with lower conservatism than simple robust optimization. This means that, even if there are errors in predicting an amount of traffic and renewable energy, it is possible to perform low-maintenance VNF allocation and route determination while suppressing the deterioration of communication performance and the occurrence of congestion, as well as preventing the purchase costs of insufficient power and the decline in the utilization rate of renewable energy.

The present invention is not limited to the above-described specifically disclosed embodiments and various modifications and changes, combinations with known techniques or the like are possible without departing from the scope of the claims.

REFERENCE SIGNS LIST

10 Control apparatus
101 Input device
102 Display device
103 External I/F
103a Recording medium
104 Communication I/F
105 Processor
106 Memory device
107 Bus
201 Prediction value collection part
202 Physical network information collection part
203 Command value acquisition part
204 Control solution calculation part
205 Control part
211 First problem solving part
212 Second problem solving part

The invention claimed is:

1. A control apparatus for allocating a virtual network to a physical network, the control apparatus comprising:
a processor; and
a memory storing instructions, which when executed, cause the processor to execute a process, the process including
performing allocation of virtual nodes in the virtual network to physical nodes in the physical network or determination of paths of a virtual link between the virtual nodes in the virtual network, based on a prediction value of an amount of traffic of a service, a prediction value of an amount of power consumption of a physical node, information relating to the physical network, and a command value relating to power supply-demand match.

2. A control apparatus for allocating a virtual network to a physical network, the control apparatus comprising:
a processor; and
a memory storing instructions, which when executed, cause the processor to execute a process, the process including
performing allocation of virtual nodes to physical nodes or determination of paths between the virtual nodes, based on a prediction value of an amount of traffic of a service, a prediction value of an amount of power consumption of a physical node, information relating to the physical network, and a command value relating to power supply-demand match, the virtual nodes preventing prediction errors with respect to both the prediction value of the amount of traffic and the prediction value of the amount of power consumption.

3. A control apparatus for embedding a virtual network in a physical network, the virtual network enabling service provision, the control apparatus comprising:
a processor; and
a memory storing instructions, which when executed, cause the processor to execute a process, the process including
acquiring a prediction value of an amount of traffic of a service and a prediction value of an amount of power consumption of a physical node to which a command value relating to the amount of power consumption is not provided, from among physical nodes configuring a physical network;

acquiring information relating to the physical network;

acquiring the command value provided to at least some of physical nodes configuring the physical network;

calculating a solution to a 2-stage optimization problem relating to allocation of virtual nodes configuring the virtual network to physical nodes and determination of paths between the virtual nodes, with a constraint condition that an amount of power consumption of a physical node to which the command value is provided satisfies the command value, based on the prediction value of the amount of traffic, the prediction value of the amount of power consumption, information relating to the physical network, and the command value; and controlling a virtual network embedded in the physical network, based on allocation of the virtual node and determination of a path represented by the solution.

4. The control apparatus according to claim 3, wherein the command value is an amount of power consumption in which a physical node to which the command value is provided needs to be satisfied or a range of the amount of power consumption in which a physical node to which the command value is provided needs to satisfied.

5. The control apparatus according to claim 3, wherein the prediction value of the amount of traffic is expressed by a nominal value of the amount of traffic and a deviation from the nominal value, and the prediction value of the amount of power consumption is expressed by a nominal value of the amount of power consumption of a physical node to which the command value is not provided and a deviation from the nominal value.

6. The control apparatus according to claim 3, wherein the calculating includes decomposing the 2-stage optimization problem into a master problem and a sub-problem, based on a column-and-constraint generation method, and then calculating a solution relating to the allocation of the virtual nodes by alternately solving the master problem and the sub-problem in a first step, and calculating a solution relating to the path determination by solving the sub-problem in a second step.

* * * * *